Sept. 6, 1927.
F. CHÁVEZ
CAR SPEED BOAT
Filed Nov. 17, 1924
1,641,574
6 Sheets-Sheet 1
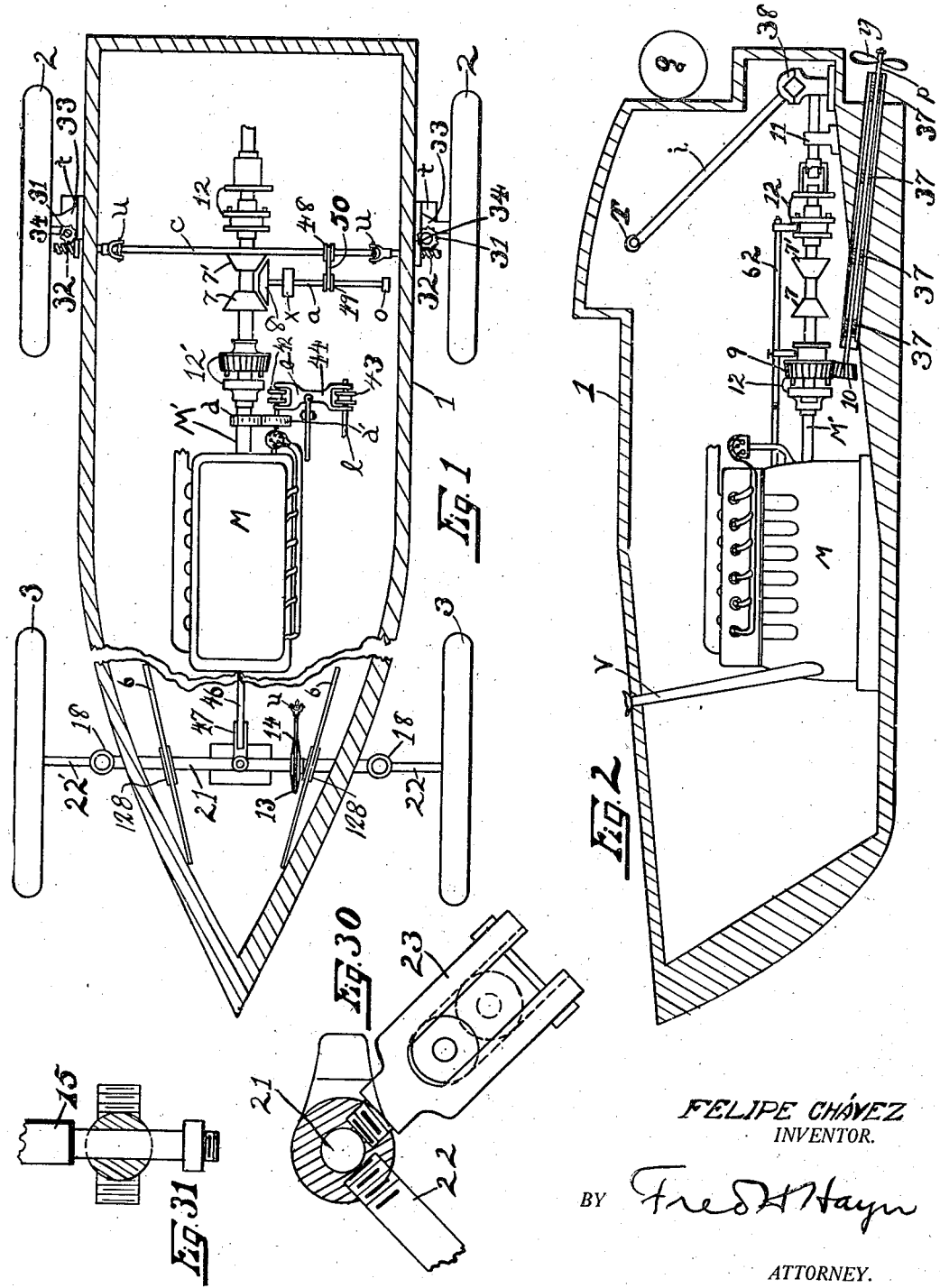
FELIPE CHÁVEZ
INVENTOR.
BY Fred H Hayn
ATTORNEY.

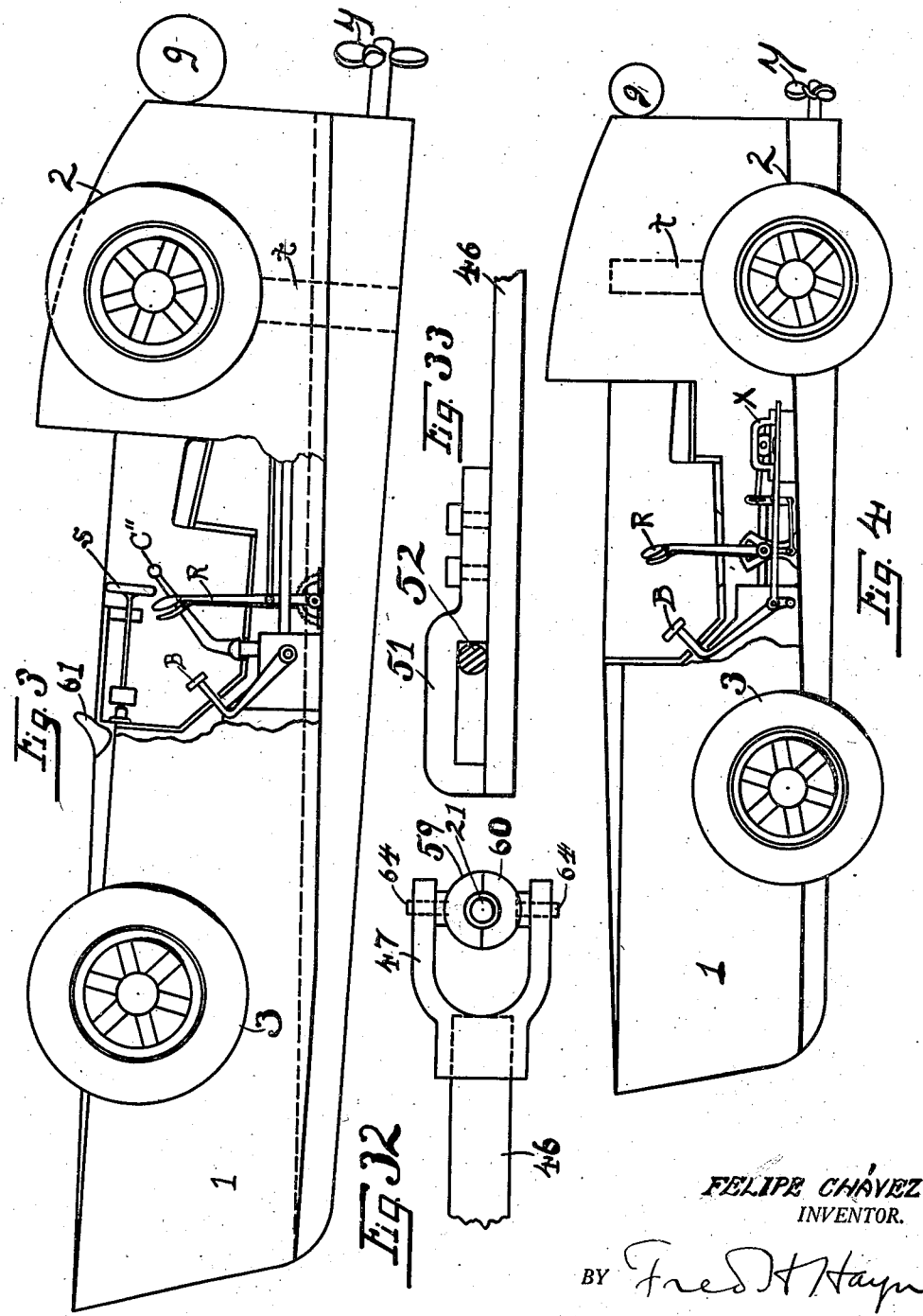

Sept. 6, 1927.   F. CHÁVEZ   1,641,574
CAR SPEED BOAT
Filed Nov. 17, 1924   6 Sheets-Sheet 3
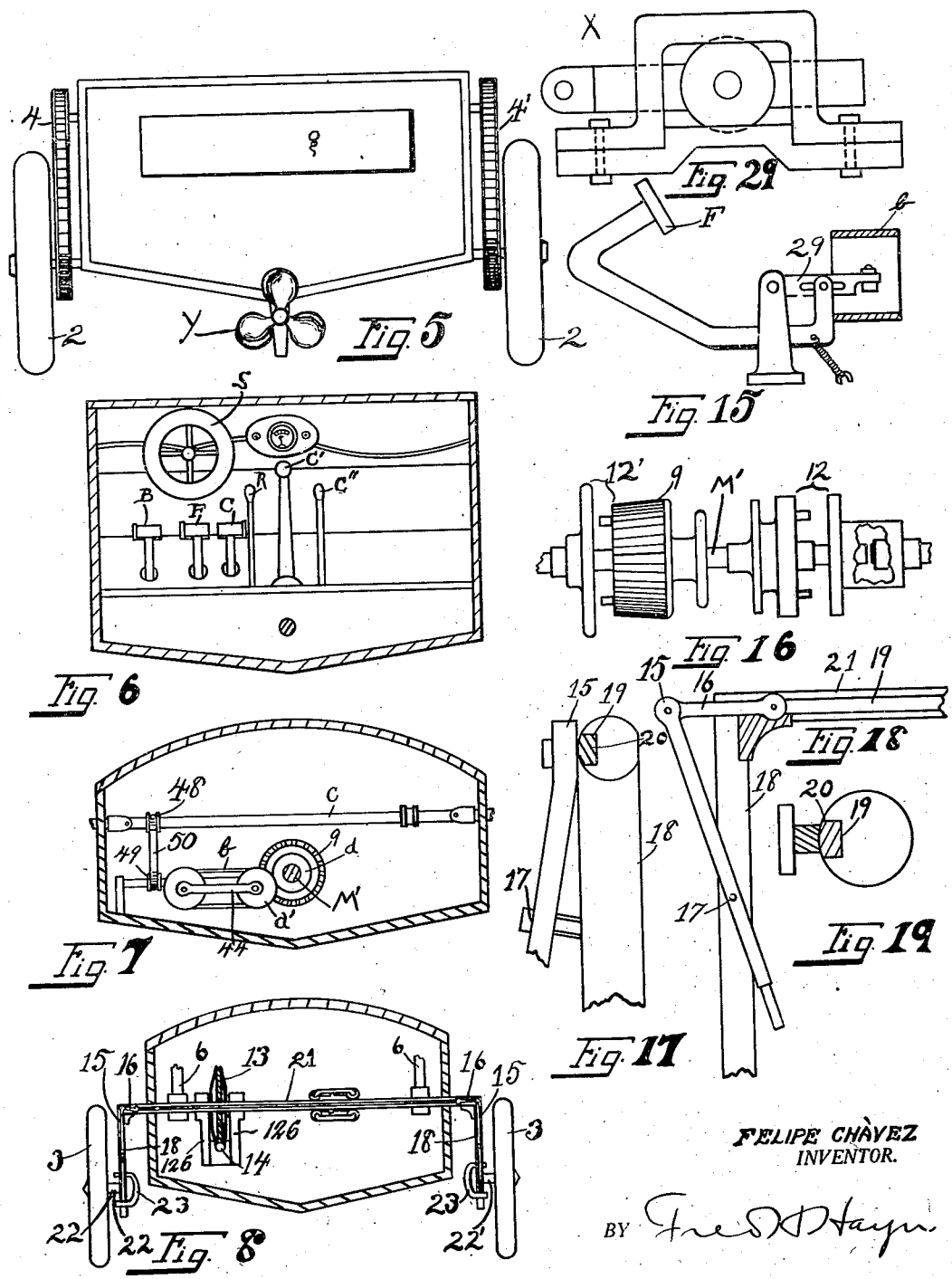

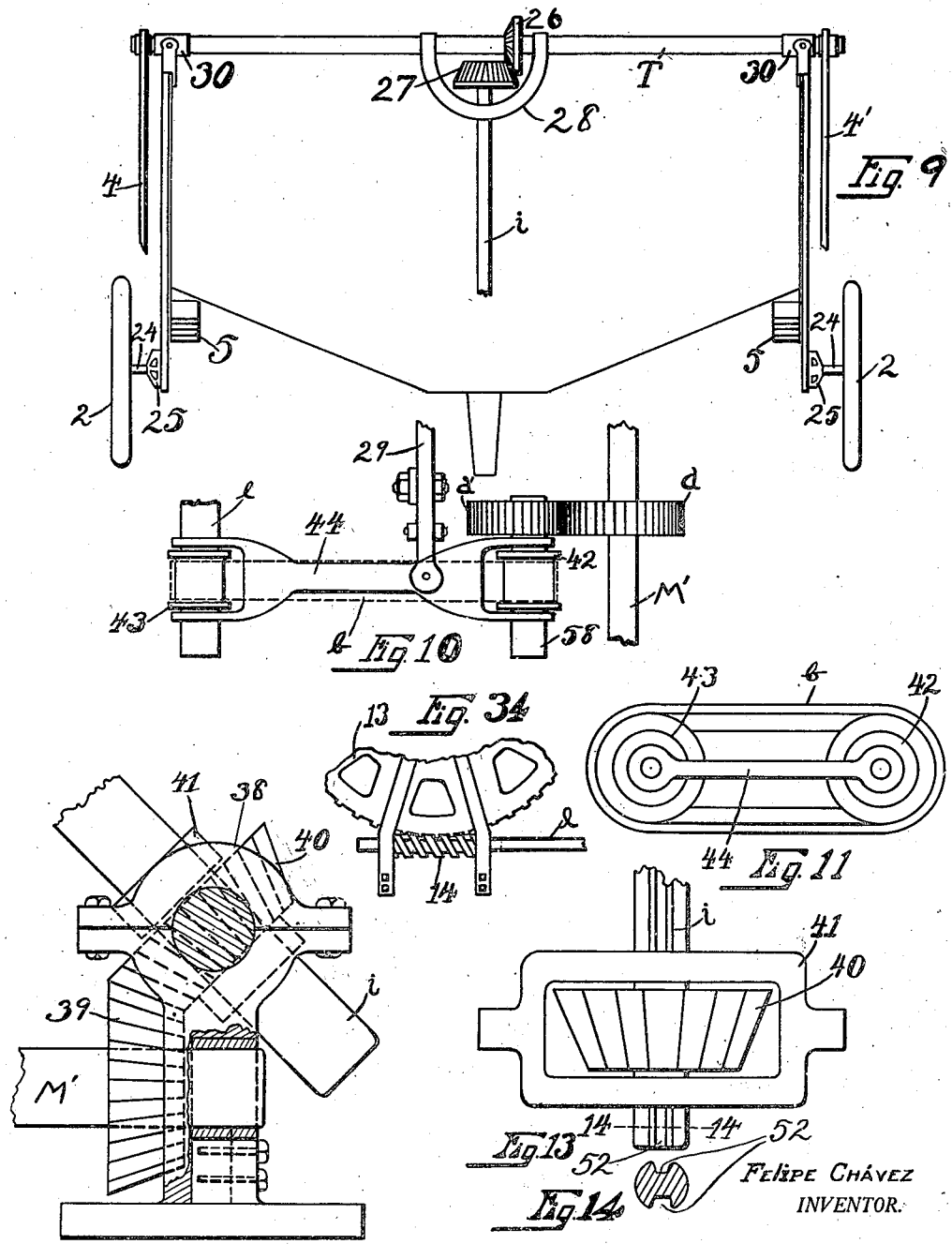

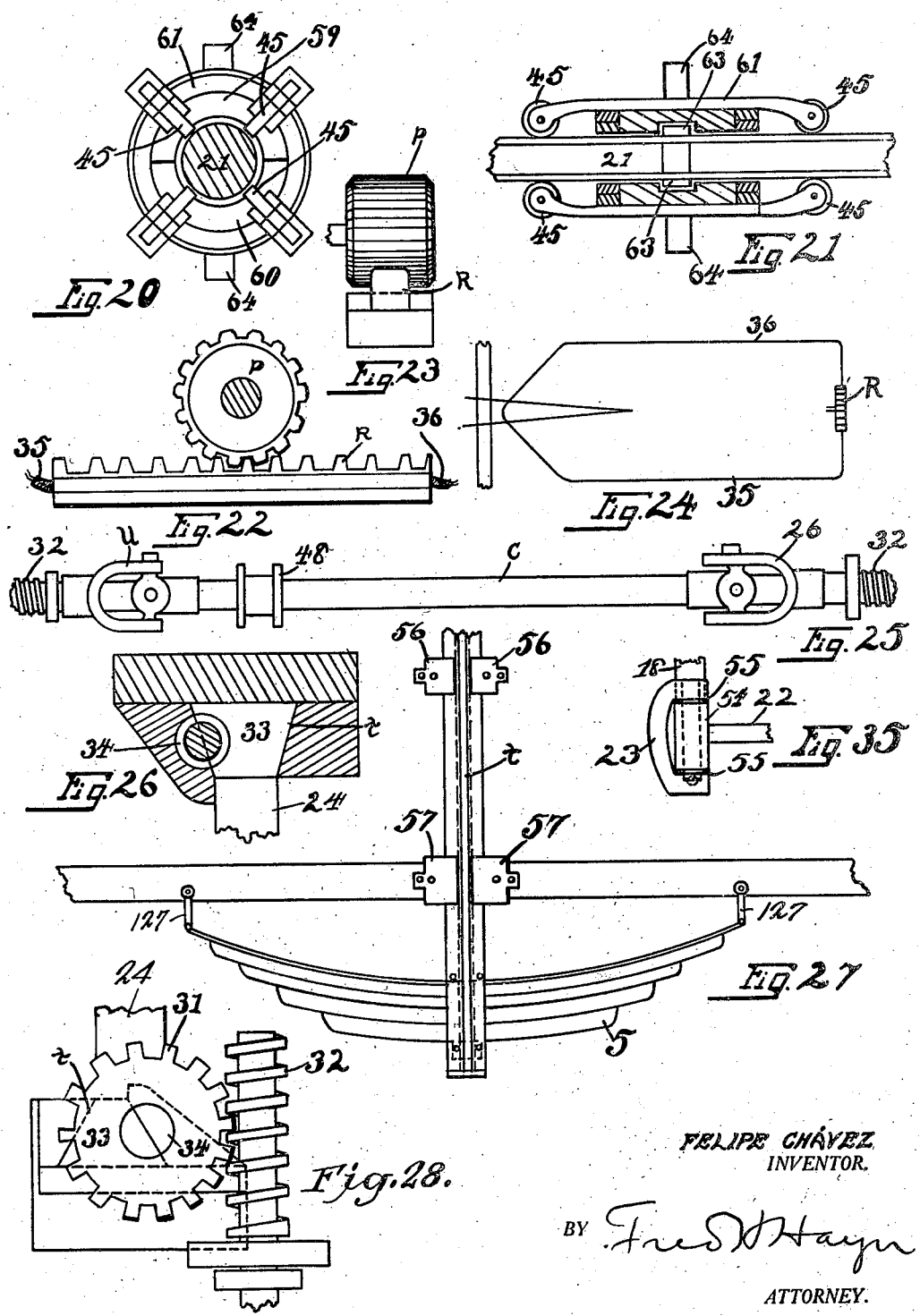

Sept. 6, 1927.
F. CHÁVEZ
CAR SPEED BOAT
Filed Nov. 17, 1924
1,641,574
6 Sheets-Sheet 6
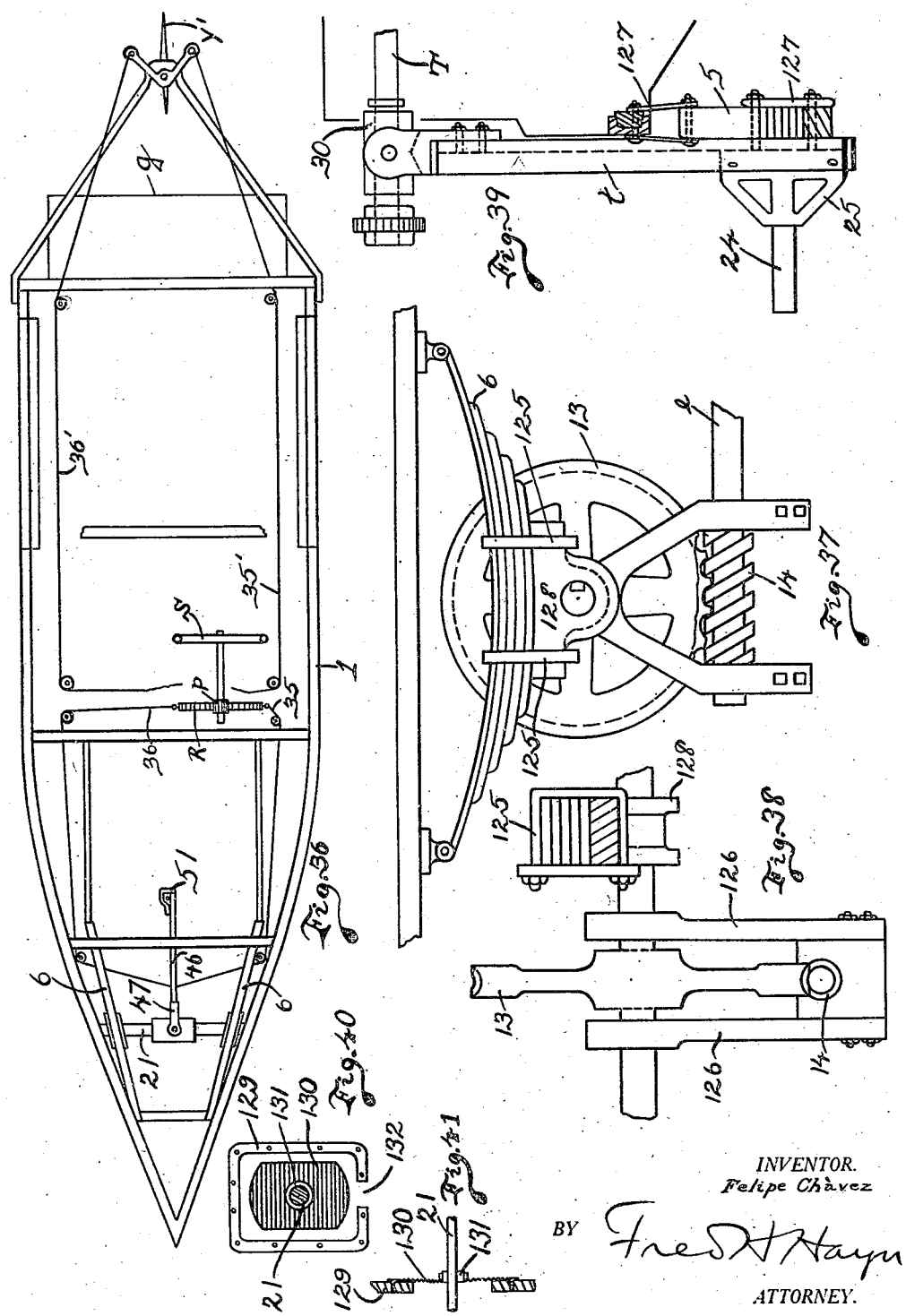
INVENTOR.
Felipe Chávez
BY Fred H Hayn
ATTORNEY.

Patented Sept. 6, 1927.

1,641,574

UNITED STATES PATENT OFFICE.

FELIPE CHÁVEZ, OF LOS ANGELES, CALIFORNIA

CAR SPEED BOAT.

Application filed November 17, 1924. Serial No. 750,255.

My invention relates to motor vehicles adapted to be operated both on land and on water, in which the vehicle is equipped with a means whereby it may be propelled on water, and also with a means for operating the same when on land, means being also provided for intermittently rendering both of said means operative or inoperative, as required.

It is an object of my invention to provide a combined land and water vehicle with a mechanism for raising and lowering sets of wheels with which my improved vehicle is provided, so that when said wheels have been raised they will be out of the way when the vehicle is operated on water.

It is also an object of my invention to provide my improved vehicle with a novel form of steering mechanism, intimately associated with said vehicle, said steering mechanism being provided with means for rendering the same intermittently operative and inoperative, so that it may be used both for steering the vehicle on land and on water.

A further object of my invention is to provide my improved vehicle with a novel form of mechanism whereby the rear wheels may be raised, to be out of the way when said vehicle is operated on water, and lowered when said vehicle is to be operated on land.

Another object of my invention is to provide an improved vehicle with a novel form of mechanism for raising and lowering the front wheels of said vehicle, said mechanism being adapted to cause said front wheels to be swung in the circumference of a circle, a semi-circumference being described by said wheels when they are raised, the other semi-circumference being described when said wheels are lowered.

It is also an object of my invention to provide my improved vehicle with a novel form of mechanism whereby the motor associated with said vehicle may be intermittently caused to operate the propeller associated with said vehicle, when on water, and the rear wheels thereof, when operated on land.

Another object of my invention is to provide my improved vehicle with a motor, which motor is adapted to drive a main shaft, which in turn, is adapted to operate a series of cross shafts, associated with an inclined shaft, through a series of appliances associated with all of said shafts.

A further object of my invention is to provide a novel form of clutch mechanism associated with the main shaft of the motor mounted on my improved vehicle, said clutch mechanism being provided with a means for rendering the same operative so that my improved rear wheel raising and lowering means may be intermittently rendered operative through the main shaft of the motor.

It is also an object of my invention to provide a novel form of mechanism associated with my improved vehicle whereby the rotation of the main shaft positioned thereon may be transmitted by a special improved transmission mechanism to an inclined shaft, which in turn is adapted to operate a set of appliances associated with the rear wheels of said vehicle.

A still further object of my invention is to provide my improved vehicle with a novel rear wheel raising and lowering means, which means has associated therewith a cross shaft provided with universal or swivel joints, the movement of said cross shaft, through a series of appliances being transmitted to the rear wheels of said vehicle.

A further object of my invention is to provide my improved vehicle with a novel form of rear wheel raising and lowering means comprising a set of slidable members equipped with stub shafts on which said wheels are mounted, said slidable members being adapted to be reciprocated in a general vertical direction in a set of tracks associated with my vehicle.

A further object of my invention is to provide my improved vehicle with a novel form of rear wheel raising and lowering mechanism in which a worm pinion and screw mechanism is used to raise and lower said wheels.

It is also an object of my invention to provide my improved vehicle with a motor adapted to drive a main shaft, which has associated therewith a mechanism intermittently adapted to raise and lower the rear wheels of said vehicle, said mechanism, preferably, though not necessarily taking the form of a set of friction cones, said cones being adapted to be brought into engagement to raise and lower said rear wheels.

A further object of my invention is to provide my improved vehicle with a novel form of bearing in which the main shaft of the motor positioned on said vehicle is supported, said bearing also supporting an inclined shaft by means of which the rear wheels of said vehicle are operated, said bearing having also associated therewith a set of appliances for transmitting the movement of said main shaft to said inclined shaft.

A still further object of my invention is to provide the inclined shaft adapted to operate the rear wheels of my improved vehicle with a set of grooves, which grooves are adapted to have associated therewith an appliance for rotating said inclined shaft, a special form of bearing being used for supporting one end of said shaft and said appliances.

It is also an object of my invention to provide a resilient means associated with the bearings of the rear wheels of my improved vehicle whereby ease and comfort may be provided for the user of said vehicle.

A still further object of my invention is to provide a novel form of vehicle in which an improved mechanism is used to raise and lower the front wheels of said vehicle.

It is also an object of my invention to provide my improved vehicle with a novel form of front wheel raising and lowering mechanism, which mechanism comprises a cog wheel positioned on the front axle associated with the front wheels, which cog wheel is adapted to be rotated with said front axle by means of a worm associated with an auxiliary shaft adapted to be driven intermittently, through a set of appliances, by the main shaft of the motor associated with said vehicle.

It is also within the province of my invention to associate with the auxiliary shaft used to drive the cog wheel to raise and lower the front wheels of my improved vehicle a universal or swivel joint so that the motion of the main shaft may be transmitted to said cog wheel in an even and uniform manner.

A further object of my invention is to provide an improved mechanism for raising and lowering the front wheels of my novel vehicle, which mechanism has associated therewith a cog wheel or master gear wheel, which gear wheel is adapted by means of a set of novel appliances, to raise and lower said front wheels in the path of a circumference of a circle, the raising of said wheels being accomplished in the path of a semi-circumference, and the lowering in the path of another semi-circumference, that is to say, the movement of said wheels through 360 degrees accomplishes both the raising and lowering of said front wheels.

Another object of my invention is to provide a set of spring pressed bearings associated with the front wheels of my improved vehicle whereby the axle associated with said wheels may be held resiliently so as to provide comfort for the user of said vehicle when it is operated on land.

A still further object of my invention is to provide my improved vehicle with a novel form of steadying and wheel lifting and lowering means associated with the front axle of said vehicle, which means includes sets of sliding members, links, pivoted levers, yoke members and sets of bearings with which the front wheels of said vehicle are associated.

It is also an object of my invention to provide my improved vehicle with a novel form of front wheel steadying and guiding mechanism associated with the front axle of said vehicle, said mechanism comprising sets of members adapted to embrace and hold said front axle, anti-friction means being associated with said members and coacting with said axle whereby a steady and uniform movement, without any excessive wear, may be applied to said axle when the front wheels are guided as the vehicle is operated on land.

A still further object of my invention is to provide a novel form of mechanism for rendering operative the means to raise and lower the front wheels associated with my improved vehicle, said mechanism including, if desired, friction means adapted to be intermittently brought into contact with other friction means associated with the main shaft positioned on said vehicle.

It is also within the province of my invention to provide a novel form of pedal operated transmission mechanism associated with my improved vehicle for intermittently rendering operative the mechanism for raising and lowering the front wheels of said vehicle, said transmission means including a set of shafts and appliances for rotating the same, one of said appliances being rendered operative by an improved link and lever mechanism operated by said pedal, an improved bearing being provided for certain of said links or levers.

Another object of my invention is to provide my improved vehicle with a novel form of steering mechanism, intimately associated with my improved vehicle, said steering mechanism including a ratchet and pinion means adapted to be intermittently rendered operative by sets of cables associated either with the front wheels of said vehicle when it is operated on land, or with the rudder when it is operated on water.

It is also an object of my invention to provide a novel form of guiding member, suitably pivoted at one end to a stationary part of my improved vehicle; and either detachably secured or securely fastened to the guiding and steadying mechanism associated with the front axle of said vehicle.

It is also within the province of my invention to provide both sets of wheels associated with my improved vehicle with a suitable balancing means, whereby, when said vehicle is operated on water, said water may be prevented from entering said vehicle.

It is moreover within the province of my invention to provide a novel form of land and water vehicle which is thoroughly practical, efficient in operation, easy to construct, thoroughly reliable, inexpensive to manufacture, not easy to get out of order, and composed of a minimum number of parts.

Further objects and advantages of my invention will become more apparent as the description thereof proceeds.

Reference is had to the accompanying drawings in which similar reference characters denote similar parts. In the drawings, Fig. 1 is a fragmentary, top plan view of my improved vehicle, certain parts being shown on a larger scale, and certain parts being omitted for the sake of clearness, Fig. 2 is a part elevational and part sectional view of my improved vehicle, with certain parts omitted for the sake of clearness, Fig. 3 is a side view of my improved vehicle showing the same in the position when it is to be operated on water, the sets of wheels being shown elevated, and part of the vehicle broken away to disclose the manner of steering the same and the means by which it is operated, Fig. 4 is a view similar to Fig. 3, but drawn upon a somewhat smaller scale, the position of the vehicle and its wheels being such when it is being operated on land, Fig. 5 is a rear end view of the vehicle when it is being operated on land, Fig. 6 is a cross sectional view through the vehicle showing the pedal and lever operating means, Fig. 7 is a similar view taken at right angles to the main shaft of the motor, showing the friction mechanism for transmitting intermittently the movement of the main shaft to the front wheel raising and lowering mechanism, Fig. 8 is a similar view showing the front wheel raising and lowering mechanism, as well as the means for steadying the same, and the axle guiding and steadying mechanism, the spring pressed bearings being shown in fragmentary form, Fig. 9 is a fragmentary rear elevational view showing the appliances and mechanism for driving the rear wheels of the vehicle when it is operated on land, Fig. 10 is a fragmentary plan view of the mechanism whereby the main shaft of the motor may be intermittently caused to actuate the front wheel raising and lowering mechanism, Fig. 11 is an elevational view of the mechanism shown in Fig. 10, certain parts being omitted, Fig. 12 is a fragmentary detail view of the plural part bearing and the appliances associated therewith for transmitting the motion of the main shaft to the inclined shaft to operate the rear wheels of the vehicle, Fig. 13 is a fragmentary detail view showing the bearing for and the manner of mounting one of the appliances for operating the inclined shaft, as shown in Fig. 12, Fig. 14 is a cross sectional view of Fig. 13 on the line 14—14, Fig. 15 is a part sectional and part elevational detail view, showing the pedal mechanism for rendering operative the transmission mechanism whereby the front wheel raising and lowering mechanism may be intermittently rendered operative, Fig. 16 is a fragmentary detail elevational view of the clutch mechanism associated with the main shaft, certain parts being broken away, Figs. 17, 18, and 19, are detail views of the link and lever mechanism associated with the front axle for steadying the front wheels when they are raised and lowered, Fig. 20 is an end view of the steadying and guiding mechanism associated with the front axle, said axle being shown in section, Fig. 21 is a fragmentary part elevational and part sectional view of Fig. 20, but shown on a somewhat different scale, Fig. 22 is a detail view of the pinion and ratchet mechanism associated with my improved steering mechanism, Fig. 23 is a detail end view of Fig. 22, Fig. 24 is a diagrammatic view showing one set of cables associated with the ratchet and pinion mechanism for steering the vehicle when it is operated on land, Fig. 25 is a detail view of one of the cross shafts associated with the mechanism for raising and lowering the rear wheels, Fig. 26 is a fragmentary detail plan view of the screw and sliding member means and track whereby the rear wheels may be raised and lowered, Fig. 27 is a fragmentary detail view showing the manner in which the rear wheel lifting tracks as well as the springs for the rear wheels are mounted on the vehicle, Fig. 28 is a detail plan view showing the worm gear on one end of the cross shaft shown in Fig. 25 for operating the pinion associated with the screw shown in Fig. 26, Fig. 29 is an elevational detail view of the bearing associated with the pedal operating means shown in Fig. 15, Fig. 30 is a detail view of parts of the mechanism shown in Figs. 17, 18, and 19, for steadying the front wheels as they are raised or lowered, Fig. 31 is a fragmentary detail view showing the manner in which one of the levers associated with the front wheel steadying means is connected to the bearing supporting the stub shaft of one of the front wheels.

Fig. 32 is a fragmentary detail view of one end of the guiding member associated with the front wheel steadying and guiding means shown in Figs. 1, 8, 20, and 21, Fig. 33 is a fragmentary detail view of the other end of the guiding member shown in Fig. 32, Fig. 34 is a fragmentary detail elevational view of the cog or master wheel and worm gear for raising and lowering the front wheels, shown in Figs. 1 and 8, Fig. 35 is a fragmentary detail elevational view of the yoke and bearing for the stub shafts of the front wheels, Fig. 36 is a plan view of the invention showing the manner in which the steering mechanism is associated with the apparatus for steering both on land and on water, certain parts being omitted for the sake of clearness, Fig. 37 is a fragmentary detail elevational view showing the manner in which the front springs are associated with the apparatus, Fig. 38 is an end view of Fig. 37, on an enlarged scale, but with certain parts omitted therefrom, Fig. 39 is a fragmentary end elevational view showing how the rear springs are mounted, Fig. 40 is a detail elevational view showing the manner in which the front axle is associated with the body of a vehicle, and the manner in which leakage is prevented, and Fig. 41 is a cross sectional view of Fig. 40, showing how the leakage preventing means is associated with the inside of the vehicle.

Describing my invention more in detail, the numeral 1 indicates the body of my improved vehicle, which body may be constructed of any suitable material, and of any shape found in practice to be desirable. Said body is, of course, constructed in such a manner and is provided with any suitable means for rendering the same water tight.

Associated with the body 1 is a pair of front wheels 3, and a pair of rear wheels 2, both sets of wheels being adapted, by a special mechanism hereinafter to be more fully described, for raising and lowering said wheels, so that they will be out of the way when the vehicle is operated on water. Such a mechanism is preferably, though not necessarily, adapted to be rendered operative through the main shaft M' driven by the motor M, positioned at any convenient place on said vehicle.

Fig. 3 shows the position of the vehicle when it is operated on water, the dotted lines on said figure indicating the water line. In this figure the front and rear wheels are shown in elevated position, out of the way of the water, and at the same time not obstructing the view of the user. The track t, hereinafter described in detail, is shown in dotted lines. A suitable wind resisting member 61 is shown positioned on the vehicle in this view. A tank g, which may be associated with the vehicle in any manner found desirable, is shown in a conventional manner on the rear of the vehicle in this view.

Fig. 4 shows the position of the vehicle when it is operated on land.

As seen in Figs. 1 and 2 the motor is positioned symmetrically on the center line of the vehicle and preferably, though not necessarily, to the fore part of said vehicle. It is, of course, to be understood that said motor may be positioned anywhere on the vehicle so long as a proper balancing of said vehicle is provided, especially when it is operated on water.

The main shaft M' is adapted to operate the rear wheels of the vehicle through a set of auxiliary shafts and appliances, and also the propeller Y when the vehicle is operated on water, a suitable clutch mechanism being provided to render said appliances intermittently operative for this purpose. Such appliances will be hereinafter more fully described.

Preferably, though not necessarily, the main shaft M' is also used to raise and lower the front and rear wheels of the vehicle, through suitable mechanism and appliances for this purpose, the hereinbefore mentioned clutch mechanism, to be hereinafter described more in detail, functioning for this purpose.

The motor M is provided with a suitable ventilating means V which may take in practice any form found to be desirable.

It is to be understood also that any form of motor or engine plant found desirable may be used on my improved vehicle, that shown being merely suggestive.

The mechanism for operating the propeller Y comprises an inclined shaft p adapted to be rotated in suitable bearings 37, which, if desired, may be provided with anti-friction means in the shape of balls or rollers. As shown in Fig. 2 the bearings 37 and the propeller shaft p are inclosed in a suitable housing to prevent the water from entering the same. The propeller shaft p is provided with a suitable gear wheel 10 adapted to be driven by the gear wheel 9 mounted on the main shaft M', said gear wheel 9 being intermittently rendered operative to mesh with said gear wheel 10 by the clutch mechanism presently to be described. It is of course to be understood that when the vehicle is operated on land the gears 9 and 10 will be out of mesh, and the propeller shaft *p* will be rendered inactive.

The mechanism for operating the vehicle on land consists of a set of cross shafts and bearings driven by the main shaft M' of the motor. Special attention is directed to Figs. 1, 2, and 9. See also Figs. 12, 13, and 14. The main shaft M' is journaled in the plural part bearing shown in Fig. 12, which bearing is designated 38. Associated with the bearing 38 is another bearing 41 in which is journaled the vertically inclined shaft *i*. Said bearing 41 is clamped on the bearing 38 as clearly shown in Fig. 12 by a cap plate and suitable nut and bolt connections. The remaining parts of the bearing 38 are assembled in the manner clearly shown in said figure and need not be described more in detail.

In close proximity with the bearing 38, the main shaft M' has mounted thereon a conical gear 39 adapted to mesh with a similar gear 40 positioned on the inclined shaft *i* by means of the grooves 52. It is of course to be understood that other means of transmitting the movement of the main shaft M' to the inclined shaft *i* may be substituted for the appliances shown and described.

A cross shaft T mounted in suitable bearings 30 on the frame 1 of the vehicle is provided with a yoke 28 which is adapted to form a bearing for the inclined shaft *i* as well as the shaft T. Said shaft T has positioned thereon a bevel gear 26 meshing with a similar gear 27 mounted on the inclined shaft *i*. Other means, of course, for transmitting the motion of the shaft *i* to that of the shaft T may be substituted for the gears 26 and 27.

Each end of the cross shaft T is provided with a gear wheel, which gear wheels are adapted to drive similar gear wheels mounted on the stub shafts 24 upon which the rear wheels 2 are positioned, through drive chains 4 and 4'. It is obvious however that any other suitable means for driving the rear wheels may be substituted for that just described. Each stub shaft 24 is mounted in a suitable bearing 25 adapted to be associated with the slidable members 33 adapted to be reciprocated in the tracks *t*, to be presently described in detail. Said bearings 25 have been omitted from Fig. 1 for the sake of clearness, but are shown on Fig. 9. Suitable springs 5, shown in Figs. 9, 27, and 39 are mounted on the frame of the vehicle in any preferred manner, as suggested by the showing in Fig. 27, and afford a means for resisting the shocks of road travel when the vehicle is operated on land.

As shown more particularly in Fig. 39, the springs 5 are positioned externally of the vehicle, and are equipped with securing means in the shape of yokes 127 secured to the tracks *t* and the external portion of the vehicle. This permits of the resilient mounting of the rear wheels, and at the same time permits their raising or lowering on the side of the vehicle along the track *t*.

The clutch mechanism whereby the main shaft M' may be intermittently caused to drive the rear wheels 2 through the mechanism just described, and the propeller shaft *p*, is shown in Figs. 1, 2, and 16. Said clutch mechanism comprises preferably two sets of clutch members 12 and 12'. When the clutch members 12' are brought into engagement, the gear 9 on the main shaft M' meshes with the gear 10 of the propeller shaft *p*. When the clutch members 12 are in engagement, the clutch members 12' are out of engagement, and the main shaft M' will drive the gears 39 and 40, shown in Fig. 12, to operate the driving mechanism of the rear wheels 2. The showing of the clutch mechanism is quite clear and accordingly need not be described more in detail. It is of course understood that the mechanism just described is suggestive merely and any other suitable mechanism may be substituted therefor.

The mechanism for raising and lowering the rear wheels of the vehicle will now be described. Reference is had more particularly to Figs. 1, 25, 26, 27, and 28. The body of the vehicle 1 has associated therewith a vertical member provided with a track *t*, secured to the body of the vehicle by means of a suitable fastening means 56 and 57, shown in Fig. 27, which may take the form of a set of plates provided with suitable bolts or other fastening means to secure said members to the body of the vehicle.

Mounted to slide in the tracks *t* are suitable beveled sliding members 33, which may take any shape found in practice to be desirable, and which are adapted to have secured thereto the bearings 25, shown in Fig. 9, and omitted from Fig. 1 for the sake of clearness, which bearings have associated therewith the stub shafts 24 upon which the rear wheels 2 are mounted.

It is of course to be understood that the vertical member bearing the track *t* may, if desired, be inclined from the vertical. Said vertical member has a screw 34, as shown more clearly in Figs. 26 and 28, adapted to be rotated by a pinion 31 by a mechanism presently to be described. The sliding member 33 is also associated with said screw 34 and is adapted to be reciprocated thereby.

As shown in Figs. 1 and 25, a cross shaft *c*, mounted in suitable bearings on the frame work of the vehicle, is provided on each end with a worm gear 32. Said cross shaft *c* has also associated therewith a pair of universal or swivel joints U to steady the movement thereof. Said cross shaft is also provided with a pulley 48 adapted to be driven by a similar pulley 49 mounted on another cross shaft $a$ arranged substanially parallel to the cross shaft $c$, a belt 50 connecting the two pulleys. It is of course to be understood that any other means for transmitting the motion of the shaft $a$ to the shaft $c$ may be substituted for that just described. The cross shaft $a$ is mounted in any form of suitable bearings $x$ and $o$.

Arranged on the main shaft $M'$ is a pair of friction cones 7 and 7', between which another friction cone, adapted to rotate the cross shaft $a$, is positioned. The cones 7 and 7' are adapted to be intermittently brought in contact with the cone 8 to cause the cross shaft $a$ to function to raise and lower the rear wheels 2 through the mechanism just described, the clutch members 12 and 12' being operated through a suitable link and lever mechanism 62. As shown on Fig. 6, the lever $C'$ is used to change the clutches or clutch members while the lever $C''$ is used to cause the clutch members 12 and 12' to function to operate intermittently the propeller shaft $p$ or the inclined shaft $i$.

The operation of raising and lowering the rear wheels 2 should now be clear. One of the friction cones 7—it is immaterial which one is used, depending upon which way the main shaft $M'$ is rotated, or whether it is desired to raise or lower the rear wheels 2—is brought in contact with the cone 8 which rotates the cross shaft $a$, which rotates the pulley 49 to cause the belt 50 to turn the pulley 48, which turns the cross shaft $c$. The worm gears 32 then rotate the pinions 31, which in turn rotate the screws 34 to raise or lower the slidable members 33 to raise or lower the rear wheels 2. It is of course to be understood that I do not desire to be limited to the use of the motor to raise and lower the rear wheels, said operation, if desired, may be done manually by any suitable mechanism.

The manner and mechanism for raising and lowering the front wheels will now be described. Especial attention is directed to Figs. 1, 8, 16, 17, 18, 19, as well as Figs. 7 and 15. See also Figs. 7, 15, 34, 10, and 11.

The main shaft $M'$ is provided with a friction or other means $d$ adapted to be intermittently brought in contact with a similar friction or other means $d'$ mounted on a short shaft 58. See Fig. 10. Said shaft 58 is mounted in a suitable connector 44, bifurcated at both ends, one end, the right, shown in Fig. 10, being adapted to be swung in a direction perpendicular to the plane of the paper, and the other end, the left in said figure, pivoted on the shaft $l$, which shaft is adapted through the universal or swivel joint U, see Fig. 1, to operate the master or cog wheel 13 through a worm gear 14, see Fig. 34, and the front axle 21 to which the wheel 13 is securely fastened in any preferred manner.

Suitable pulleys 42 and 43, connected by a belt $b$, are mounted on the shafts 58 and $l$. It will thus be seen that the motion of the main shaft $M'$, when the friction disc $d'$ is swung into engagement with the disc $d$ on said main shaft, is transmitted to the longitudinal shaft $l$.

To swing the disc $d'$ into engagement with the disc $d$, and operating lever 29 has one end brought into engagement with the belt $b$, see Fig. 15, by means of a pedal F, through suitable connections and against the action of the spring shown in said figure. The operation thus described should be manifest by a mere inspection of said figures; accordingly the various members comprising the mechanism need not be described more in detail.

Attention is now directed to Figs. 1, 8, and 16 to 19 inclusive. The front axle 21 upon which the cog wheel 13 is mounted is provided with a pair of depending members 18. Said axle 21 is grooved as indicated by the numeral 19, and in said groove are adapted to slide a pair of members 20, to each of which is secured a link 16. To the outer end of each link 16 is pivoted a lever 15, fulcrumed on the member 18 at 17. The lower end of each of the levers 15 has associated therewith a yoke 23, and each yoke has associated therewith a bearing 54 spaced from the yoke by washers 55. See Fig. 35. Associated with each bearing 54 is a stub shaft 22 upon which the front wheels 3 are mounted.

The purpose of the mechanism just described is to steady the movement of the front wheels as they are raised or lowered. Should it be desired to operate the vehicle on water, said vehicle is brought to the water's edge and stopped. The foot pedal F is then depressed against a spring and one end of the lever 29 brought in contact with the belt $b$. This causes the friction disc $d'$ to be brought into engagement with the disc $d$ on the main shaft $M'$ which transmits its rotation to the longitudinal shaft $l$, as just described, to operate the worm gear 14 to turn the cog or master wheel 13. The movement of the wheel 13 causes the axle 21 to be turned which, through the depending arms 18 and yokes 23 causes the wheels 3 to be raised in the path of a semi-circumference, the link and lever mechanism, as just described, serving to steady the movement. After said semi-circumference has been completely described, the wheels 3 will be in the position shown in Fig. 3. The pedal F is now released, and the spring will bring the end of the lever 29 back to the position shown in Fig. 15, the friction wheel $d'$ being out of engagement with the friction disc *d*. Continued operation of the motor will cause the rear wheels 2 to push the vehicle into the water, after which said rear wheels 2 may be raised in the manner previously described. The momentum of the vehicle will push the same into the water so that the propeller Y may be brought into operation as described. To lower the front wheels the pedal F is again depressed and through the mechanism described, the wheels 3 will be caused to complete the remaining semi-circumference of the circle, said circle being completely described when the wheels are completely lowered as shown in Fig. 4. The pedal F is of course then released.

The manner in which the springs 6 are associated with the vehicle is more particularly shown in Figs. 37 and 38. As shown in Figs. 1 and 36, the springs 6 are secured to the frame work of the vehicle on the inside, and as shown more particularly in Fig. 37, each spring is equipped with a bearing 128, preferably constructed as shown, which bearings have the shaft 21 journaled therein, and which bearings are securely held to the springs 6 by means of the yokes 125, preferably though not necessarily, constructed as shown, and which yokes securely hold said bearings in position, the shaft 21 being thus resiliently mounted.

As shown in Figs. 8 and 38, the wheel 13 is equipped with bearing supports 126 in which the shaft 21 is journaled.

To permit the front axle or shaft 21 to rise and fall with the springs 6 and at the same time prevent leakage, the inside of the vehicle where said axle projects through to the outside, plates 129 are positioned by means of any preferred fasteners, such as bolts or other fastening means, a corrugated strip of rubber or other material impervious to water being associated in any preferred manner with the plates 129, said material being indicated by the numeral 130. The shaft 21 is encircled by a collar 131 or similar device to which the material 130 is secured, an opening 132 being provided for the purpose of slipping the plate 129 over the axle 21.

It will be observed, especially from Fig. 4, that the axle 21 is at a considerable distance above the water line, when the apparatus is used on water, said axle in practice being about fifteen inches above said water line. Nevertheless, as indicated in the first paragraph page 7, a suitable means should be provided to prevent effectively any of the water caused by splashing, or the up and down movement and rolling of the vehicle on water, from reaching the inside thereof. For this reason the structure shown in Figs. 40 and 41 is provided, which resembles somewhat the connections commonly used on trains.

The front wheel guiding mechanism will now be described. This mechanism is used for steadying and guiding said front wheels. A pair of semi-circular members 59 and 60 are adapted to embrace the axle 21, see Figs. 20 and 21, and said members are embraced by a pair of other semi-circular members 61, secured together by bolts or other means, as shown in said figures. The axle 21 is provided with suitable projections or other members 63, adapted to engage in slots provided in the members 59 and 60, the members 61 being provided with anti-friction rollers or means 45 to prevent wear on said axle and at the same time provide for a steady and easy movement. Of course, other suitable means may be substituted for the construction thus described.

To render the front wheel guiding and steadying means operative, a guiding member 46, shown in Figs. 32 and 33 is provided. Said member has at one end a yoke 47, adapted to be connected to the members 60 through the projections 64 associated therewith. The other end of the member 46 is provided with a loop 51, secured thereto as shown in Fig. 33 by means of suitable bolts or other means. A circular bar or other means 52 is used to pivot the member 46 to a stationary part of the vehicle.

As will be observed from Figs. 1 and 8, the front axle 21 is held in suitable bearings, resiliently mounted on any preferred form of spring 6, which may be similar to the springs 5 associated with the rear wheels of the vehicle.

As shown diagrammatically in Fig. 24, the cables 35 and 36, connecting the rack R to the member 46 causes said member to function to guide and steer the front wheel by the mechanism just described. Turning the steering wheel S, rotates the pinion P, which causes the rack R to be reciprocated in the required direction to steer the front wheels.

To steer the rudder, Y', other wire cables, 35' and 36', extending to the rear of the vehicle, and to said rudder, are hooked on to the rack R, the wires 35 and 36 being unhooked see Fig. 36. Since such a construction is perfectly obvious further illustration and description are not deemed necessary.

It is of course to be understood that my improved vehicle is provided with a suitable brake mechanism operated by the pedal B, but since such mechanism may be any desired, it has neither been shown nor described.

It is also clear that means for lubricating the various parts may be provided, such as oil cups, grease cups etc.

While I have thus described my apparatus with great particularity, it will be obvious that the construction shown and described may be varied throughout a wide range. I desire therefore to have it distinctly understood that I do not desire to be limited to the exact details of such construction, but reserve the right to make any and all modifications thereof that fall within the scope of the appended claims.

I claim as my invention:

1. In a combined land and water vehicle, in combination, a water tight body, a propeller associated with said vehicle whereby the same may be operated when on water, front and rear wheels associated with said vehicle for operating the same when on land, a steering mechanism associated with said vehicle, means associated with said steering mechanism whereby it may be rendered operative to steer said vehicle when on land and also when on water, a motor positioned on said vehicle, mechanism associated with said motor and said wheels for operating the same when on land. mechanism associated with said motor and said propeller for operating said vehicle when on water, mechanism associated with said motor and with both of said front wheels and said rear wheels to raise said front wheels in the arc of an entire circumference, and said rear wheels in the path of a straight line when said vehicle is to be operated on water, and to lower the same when said vehicle is to be operated on land.

2. In a combined land and water vehicle, a propeller associated with said vehicle for operating the same when on water, front and rear wheels associated with said vehicle for operating the same on land, a motor mounted on said vehicle, a main shaft operated by said motor, beveled gears associated with said main shaft, said propeller, and said rear wheels, whereby said shaft may operate said propeller and said rear wheels, mechanism associated with said shaft whereby said motor may be caused to selectively operate said rear wheels and said propeller, a cable steering mechanism positioned on said vehicle, and means for rendering said steering mechanism selectively operative to steer said vehicle both on land and on water.

3. In a combined land and water vehicle, in combination, means associated with said vehicle for operating the same both on land and on water, means positioned on said vehicle for rendering said first means operative, and means associated with said vehicle whereby it may be selectively steered on land and on water said last means comprising a rack and pinion mechanism having associated therewith a cable adapted to be intermittently attached to said rack.

4. In a combined land and water vehicle, in combination, sets of front and rear wheels associated with said vehicle for operating the same on land, means associated with said vehicle for operating same when on water and when said sets of wheels are raised on said vehicle, means for steering said vehicle when on land and when on water, mechanism associated with said vehicle for raising and lowering said front wheels in the circumference of a circle, and means associated with said rear wheels for raising and lowering said rear wheels in a generally vertical direction.

5. In a combined land and water vehicle, in combination, a steering mechanism for steering said vehicle on land and on water, said mechanism comprising a rack and pinion and a cable adapted intermittently to be secured to said rack a motor adapted to propel said vehicle on land and on water, a main shaft driven by said motor, appliances adapted to be operated by said main shaft to propel said vehicle both on land and on water, and pedal and hand operated mechanism for rendering said appliances effective.

6. In a combined land and water vehicle, in combination, a steering mechanism for guiding said vehicle both on land and on water, sets of front and rear wheels associated with said vehicle for operating the same on land, a propeller associated with said vehicle for operating the same when on water, a motor positioned on said vehicle, a main shaft driven by said motor, appliances adapted to be made to coact with said main shaft to raise and lower said front wheels in the arc of an entire circumference, appliances adapted to be made to coact with said main shaft to raise and lower said rear wheels in a generally vertical direction, appliances adapted to be made to coact with said main shaft to operate said propeller, appliances adapted to be made to coact with said main shaft to operate said rear wheels, and mechanism associated with said main shaft and said appliances whereby they may be intermittently rendered operative.

7. In a combined land and water vehicle, in combination, a steering mechanism for guiding said vehicle both on land and on water, sets of front and rear wheels associated with said vehicle for operating the same on land, a propeller associated with said vehicle for operating the same when on water, a motor positioned on said vehicle, a main shaft driven by said motor, a cross shaft positioned above said main shaft, appliances associated with said main shaft and said cross shaft whereby said main shaft may be made to drive said cross shaft, appliances associated with said cross shaft and said rear wheels whereby said cross shaft may be made to drive said rear wheels, and mechanism associated with said main shaft and said sets of front and rear wheels whereby said motor may be caused to raise and lower said wheels respectively in the arc of a circumference and in a generally vertical direction.

8. In a combined land and water vehicle, in combination, a steering mechanism for guiding said vehicle both on land and on water, sets of front and rear wheels associated with said vehicle for operating the same when on land, a propeller associated with said vehicle for operating the same when on water, a motor positioned on said vehicle for intermittently operating said rear wheels and said propeller, mechanism associated with said motor for raising and lowering said front wheels, mechanism associated with said rear wheels and said motor for raising and lowering said rear wheels, and resilient means associated with said front and rear wheels and adapted to resist the shocks of travel when on land, said resilient means being held stationary when said wheels are raised or lowered.

9. In a combined land and water vehicle, in combination, means for operating said vehicle both on land and on water, steering mechanism associated with said means, said steering mechanism comprising a rack and pinion and cable adapted to be intermittently associated therewith, and means associated with said first means and said vehicle whereby said land operating means will not interfere with said water operating means.

10. In a combined land and water vehicle, in combination, a steering mechanism for guiding said vehicle both on land and on water, sets of front and rear wheels associated with said vehicle for operating the same when on land, a propeller associated with said vehicle for operating the same when on water, and rack, pinion and cable mechanism associated with said steering mechanism whereby it may intermittently be rendered operative to guide said front wheels when said vehicle is operated on land and also to render said steering mechanism operative when said vehicle is operated on water.

11. In a combined land and water vehicle, in combination, mechanism associated with said vehicle for operating the same both on land and on water, a motor positioned on said vehicle to render said mechanism operative, a rack, pinion and cable steering mechanism associated with said vehicle and said mechanism for guiding said vehicle both on land and on water, and pedal and manual means for rendering said motor operative to operate said mechanism.

12. In a combined land and water vehicle, in combination, sets of front and rear wheels associated with said vehicle, a motor positioned on said vehicle for operating rear wheels, means associated with said vehicle for steering the same both on land and on water, mechanism associated with said motor and said rear wheels for operating the same when said vehicle is on land, pedal operating means for raising and lowering said front wheels, manually controlled means for raising and lowering said rear wheels, and means adapted to be operated by said motor for operating said vehicle when on water.

13. In a combined land and water vehicle, in combination, means associated with said vehicle whereby it may be intermittently operated on land and on water, said means comprising a motor, a propeller associated with said vehicle, mechanism associated with said propeller and said motor whereby said motor may be intermittently caused to operate said propeller, sets of front and rear wheels associated with said vehicle, mechanism associated with said motor and said wheels whereby they may be intermittently raised and lowered respectively in the arc of a circumference and in a generally vertical direction, and mechanism associated with said motor, said propeller and said rear wheels whereby said first mechanism may be rendered operative.

14. In a combined land and water vehicle, in combination, a set of wheels associated with said vehicle whereby the same may be operated when on land, a motor positioned on said vehicle, a main shaft adapted to be driven by said motor, a cross shaft, an inclined shaft, appliances associated with both of said shafts whereby said main shaft is adapted to intermittently drive said shafts, a propeller associated with said vehicle and adapted to be intermittently driven by said main shaft, mechanism associated with said main shaft whereby said intermittent action is rendered possible, and manual means associated with said mechanism whereby it may be rendered effective.

15. In a combined land and water vehicle, in combination, a motor positioned on said vehicle, a main shaft adapted to be driven by said motor, a set of wheels associated with said vehicle, mechanism associated with said main shaft and at least two of said wheels whereby said shaft may be caused to drive said wheels, an inclined propeller shaft, a propeller associated with said propeller shaft whereby said propeller may drive said vehicle when on water, and mechanism associated with said main shaft, said rear wheels, and said propeller, whereby said main shaft may be selectively caused to actuate said wheels or said propeller, to operate said vehicle selectively on land and on water.

16. In a combined land and water vehicle, in combination, sets of front and rear wheels mounted on said vehicle, a propeller positioned on said vehicle to operate the same when on water, a motor positioned on said vehicle, a shaft adapted to be operated by said motor, mechanism associated with said rear wheels and said shaft for propelling said rear wheels, mechanism associated with said main shaft and said rear wheels for raising or lowering the same respectively in the arc of a circumference and in a generally vertical direction, mechanism associated with said main shaft and said front wheels for raising and lowering the same, and mechanism associated with said main shaft and said propeller for operating the same when positioned on water.

17. In a combined land and water vehicle, in combination, means associated with said vehicle for steering the same both on land and on water, a propeller associated with said vehicle for operating the same on water, sets of front and rear wheels associated with said vehicle for operating the same when on land, a motor on said vehicle, a main shaft driven by said motor, said main shaft being intermittently adapted to render said wheels and said propeller operative, and sets of clutches associated with said main shaft and in line therewith, said propeller and said wheels for rendering the same intermittently operative.

18. In a combined land and water vehicle, in combination, means for steering said vehicle both on land and on water, a propeller associated with said vehicle for operating the same when on water, sets of wheels associated with said vehicle for operating the same when on land, a motor positioned on said vehicle, a main shaft adapted to be driven by said motor, a cross shaft mounted on said vehicle, an inclined shaft in juxtaposition with said main shaft and said cross shaft, mechanism associated with said main shaft and said inclined shaft for driving said inclined shaft, mechanism associated with said inclined shaft and said cross shaft for driving the same, mechanism associated with said cross shaft, a pair of said wheels for driving the same, and mechanism associated with said main shaft and said propeller for driving the same.

19. In a combined land and water vehicle, in combination, sets of wheels associated with said vehicle, a propeller associated with said vehicle for operating the same when on water, a motor mounted on said vehicle, a shaft adapted to be driven by said motor, means associated with said front wheels whereby they may be steered, said means comprising circular members and sets of rollers, means associated with said first means whereby said vehicle may be steered when on water, and mechanism associated with said shaft whereby said propeller may be driven.

20. In a combined land and water vehicle, in combination, a motor mounted on said vehicle, a shaft adapted to be operated by said motor, mechanism for causing said shaft to operate said vehicle when on land, mechanism for causing said shaft to operate said vehicle when on water, and a rack and pinion and cable steering mechanism associated with said vehicle intermittently operative to guide said vehicle both on land and on water.

21. In a combined land and water vehicle, in combination, a motor mounted on said vehicle, a shaft adapted to be operated by said motor, front and rear wheels associated with said vehicle to operate the same when on land, a propeller associated with said vehicle to operate the same when on water, mechanism for causing said motor to raise and lower said rear wheels in a general vertical direction, mechanism for causing said motor to raise and lower said front wheels in the arc of an entire circumference, and a steering mechanism for guiding said vehicle both on land and on water, said steering mechanism comprising a rack and pinion adapted to be intermittently associated with said front wheels when said vehicle is on land and with a rudder associated with said vehicle when it is on water.

22. In a mechanism for raising and lowering the front wheels of the vehicle adapted to be operated on land and on water, a motor on said vehicle, a shaft adapted to be operated by said motor, appliances for transmitting the motion of said shaft to said front wheels, and foot operative means associated with at least one of said appliances for causing said shaft to raise and lower said front wheels in the arc of a circumference.

23. In a mechanism for raising and lowering the front wheels of a vehicle adapted to be operated on land and on water, in combination, a motor positioned on said vehicle, a shaft adapted to be operated by said motor, appliances associated with said wheels and said shaft for transmitting the motion of said shaft to said wheels, one of said appliances comprising a friction operated means for transmitting the rotary movement of said shaft to another of said appliances, and means associated with one of said appliances whereby said motor may be rendered operative to raise and lower said wheels at will.

24. In a vehicle adapted to be operated on land and on water, in combination, a pair of front wheels adapted to be raised and lowered on said vehicle, a motor positioned on said vehicle, a shaft adapted to be operated by said motor, appliances adapted to transmit the motion of said shaft to said front wheels, a pair of friction disks associated with said shaft and said appliances whereby the motion of said shaft may be transmitted thereto, and foot-pressed means associated with said friction disks whereby said front wheels may be intermittently raised and lowered on said vehicle at will.

25. In a mechanism for raising and lowering the front wheels of a vehicle adapted to be operated on land and on water, in combination, a motor on said vehicle, a shaft adapted to be rotated by said motor, an auxiliary shaft positioned in substantially parallel relation with said first shaft, a third shaft also positioned in substantially parallel relation with said first shaft, means on said first shaft for transmitting the motion of said shaft to said auxiliary shaft, means associated with said auxiliary shaft and said third shaft for transmitting the motion of said auxiliary shaft to said third shaft, rotary means associated with said front wheels for raising and lowering the same.
means for transmitting the movement of said third shaft to said rotary means, and foot pedal means for intermittently rendering said rotary means operative.

26. In a combined land and water vehicle, in combination, a motor on said vehicle, a shaft adapted to be rotated by said motor, a pair of front wheels associated with said vehicle, mechanism for transmitting the motion of said shaft to said front wheels, and means associated with said vehicle whereby said shaft may intermittently be caused to raise and lower said front wheels at will in the arc of a circumference.

27. In a combined land and water vehicle, in combination, a motor on said vehicle, a shaft adapted to be operated by said motor, mechanism for intermittently raising and lowering the front wheels of said vehicle, said mechanism including friction disks associated with said shaft, foot pedal operated mechanism juxtaposed to and associated with said friction disks whereby when said mechanism is operated said motor may be caused to raise and lower said front wheels at will.

28. In a combined land and water vehicle, in combination, a motor on said vehicle, a shaft adapted to be operated by said motor, a pair of front wheels associated with said vehicle, mechanism associated with said front wheels whereby they may be raised or lowered in the arc of an entire circumference of a circle, and means associated with said shaft and said mechanism whereby said motor may render said mechanism operative.

29. In a combined land and water vehicle, in combination, a motor, a shaft adapted to be operated by said motor, a pair of front wheels associated with said vehicle, an axle upon which said wheels are adapted to be rotated, a cog wheel secured to said axle, link and lever mechanism associated with said axle and said front wheels for steadying the same, mechanism associated with said shaft and said cog wheel whereby said axle may be rotated to raise and lower said front wheels in the arc of a circle, and means associated with said mechanism for rendering the same intermittently operative.

30. In a combined land and water vehicle, in combination, a motor, a shaft adapted to be operated by said motor, a pair of front wheels associated with said vehicle, an axle upon which said wheels are mounted, mechanism associated with said shaft and said axle whereby said motor may be caused to raise and lower said front wheels, a steering mechanism associated with said axle, said steering mechanism comprising a steering wheel, a steering column adapted to be moved by said steering wheel, means on said axle for steadying and guiding said front wheels, and means associated with said steering column and said first means for transmitting the movement of said wheels to said axle.

31. In a combined land and water vehicle, in combination, a motor on said vehicle, a main shaft adapted to be operated by said motor, a pair of front wheels associated with said vehicle, an axle upon which said front wheels are adapted to be mounted, said axle being provided with a groove, slidable members adapted to be reciprocated in said grooves, links associated with and adapted to be reciprocated with said sliding members, levers associated with and adapted to be operated by said sliding members, yokes associated with and adapted to be operated by said levers, stub shafts associated with said yokes and said front wheels, a cog wheel secured to said axle, and mechanism associated with said main shaft and said cog wheel whereby said motor may be caused to intermittently raise and lower said front wheels at will.

32. In a combined land and water vehicle, in combination, a motor on said vehicle, a main shaft adapted to be rotated by said motor, a friction wheel positioned on and adapted to be rotated by said main shaft, a first auxiliary shaft positioned in parallel relation with said main shaft, a second friction wheel mounted on said first auxiliary shaft and adapted to be brought into contact with said first friction wheel, a second auxiliary shaft mounted in parallel relation with said first auxiliary shaft, pulleys mounted on each of said auxiliary shafts, a belt positioned on said pulleys, foot pedal means associated with said belt adapted to bring said friction wheels into contact, and mechanism associated with said second auxiliary shaft and the front wheels of said vehicle whereby said wheels may be raised or lowered when said foot pedal means is actuated.

33. In a mechanism for raising and lowering the front wheels of a combined land and water vehicle, a motor on said vehicle, a shaft adapted to be operated by said motor, a pair of front wheels associated with said vehicle, an axle upon which said front wheels are mounted, depending members positioned on each end of said axle, a stub shaft associated with each of said depending members, each of said front wheels being positioned on each of said stub shafts, mechanism associated with said axle and said depending members for causing said depending members to raise and lower said front wheels, mechanism associated with said first mechanism and said main shaft whereby said first mechanism may be rendered operative, and foot-operated mechanism whereby said last mentioned mechanism may be rendered operative.

34. In a mechanism for raising and lowering the front wheels of a combined land and water vehicle, in combination, a motor on said vehicle, a shaft adapted to be operated by said motor, an axle upon which said front wheels are mounted, means associated with said front wheels and said axle for resiliently mounting said front wheels, and appliances associated with said shaft and said axle whereby said motor may be caused to raise and lower said front wheels in the arc of a circumference.

35. In a combined land and water vehicle, in combination, sets of front and rear wheels associated with said vehicle, a motor positioned on said vehicle, a main shaft adapted to be driven by said motor, mechanism associated with said main shaft and said rear wheels whereby they may be lifted, mechanism associated with said main shaft and said front wheels whereby they may be raised or lowered, a rack and pinion mechanism associated with said front wheels, and a set of wires associated with said front wheels and said rack and pinion mechanism whereby said front wheels may be guided.

36. In a mechanism for operating the propeller of a combined land and water vehicle, in combination, a motor on said vehicle, a main shaft adapted to be driven by said motor, an inclined shaft in juxtaposition with said main shaft, a propeller adapted to be operated by said inclined shaft, a casing enclosing said inclined shaft, bearings in said casing and in which said inclined shaft is adapted to be operated, and appliances associated with both of said shafts whereby said main shaft may be intermittently caused to operate said inclined shaft to render said propeller operative.

37. In a mechanism for operating the propeller of a combined land and water vehicle, in combination, a motor on said vehicle, a main shaft adapted to be driven by said motor, an inclined shaft in juxtaposition with said main shaft, a casing enclosing said inclined shaft, a propeller mounted on said inclined shaft, anti-friction bearings in said casing for said inclined shaft, appliances on both of said shafts adapted to cause said main shaft to drive said inclined shaft, and clutch mechanism for intermittently rendering said appliances operative.

38. In a combined land and water vehicle, in combination, a motor on said vehicle, a shaft adapted to be driven by said motor, sets of front and rear wheels associated with said vehicle, mechanism associated with said sets of wheels and said shaft whereby said shaft may be caused to raise and lower said wheels respectively in the arc of a circumference and in a generally vertical direction, and a series of clutches associated with said shaft and said mechanism whereby said mechanism may be rendered operative.

39. In a mechanism for raising and lowering the front wheels of a combined land and water vehicle, in combination, a motor on said vehicle, a shaft adapted to be driven by said motor, mechanism associated with said front wheels and said shaft for raising and lowering said front wheels, foot pedal mechanism for rendering said first mentioned mechanism operative, and a bearing associated with said foot pedal mechanism, said bearing comprising a yoke, a member adapted to be reciprocated in said yoke, and means whereby said member may be reciprocated.

40. In a combined land and water vehicle, in combination, mechanism for raising and lowering the rear wheels of said vehicle, a motor on said vehicle, a pair of tracks positioned on said vehicle and juxtaposed to said wheels, a member adapted to be reciprocated in each of said tracks, a stub shaft upon which each of said wheels is mounted, a cross shaft associated with each of said members, mechanism associated with each of said members and said cross shaft whereby said members and said wheels may be raised and lowered, a shaft adapted to be driven by said motor, and mechanism for intermittently rendering said shaft operative to cause said cross shaft to raise and lower said wheels.

41. In a mechanism for raising and lowering a pair of wheels associated with a land and water vehicle, in combination, a pair of tracks associated with said vehicle, a slidable member positioned in each of said tracks, means for connecting each of said wheels to each of said slidable members, means associated with each of said slidable members for raising and lowering them, and means positioned on said vehicle for rendering said last means operative.

42. In a combined land and water vehicle, in combination, mechanism for raising and lowering the rear wheels of said vehicle, said mechanism comprising tracks positioned on said vehicle, an elongated member positioned in each of said tracks, a stub shaft connected to each of said members, a wheel mounted upon each of said stub shafts, a cross shaft on said vehicle and positioned in close proximity with said members, mechanism connecting said cross shaft with each of said members, and means associated with said cross shaft to cause the same to operate said mechanism to move said members to raise and lower said wheels.

43. In a mechanism for lowering and raising the rear wheels of a combined land and water vehicle, in combination, a set of tracks positioned in a generally vertical direction on said vehicle, a slidable member positioned in each of said tracks, a stub shaft associated with each of said members, a wheel mounted on each of said stub shafts, rotary means associated with each of said members whereby they may be reciprocated in said tracks, a cross shaft positioned in close proximity with said rotary means, means on each end of said cross shaft adapted to coact with each of said rotary means to render the same operative, and means positioned on said vehicle whereby said cross shaft may function to raise and lower said wheels.

44. In a mechanism for raising and lowering the rear wheels of a land and water vehicle, in combination, a motor mounted on said vehicle, a main shaft adapted to be driven by said motor, a cross shaft adapted to be intermittently driven by said main shaft, a pair of rear wheels associated with said vehicle, means for slidably mounting said wheels on said vehicle, means associated with said last means and said cross shaft whereby said cross shaft may raise and lower said wheels, and means associated with said main shaft for causing the same to intermittently actuate said cross shaft.

45. In a mechanism for raising and lowering the rear wheels of a land and water vehicle, in combination, a motor on said vehicle, a main shaft adapted to be driven by said motor, a cross shaft adapted to be driven by said main shaft, a pair of wheels adapted to be raised and lowered on said vehicle, a worm and screw mechanism for transmitting the movement of said cross shaft to said wheels, and means associated with said main shaft whereby said main shaft may be intermittently caused to operate said cross shaft to raise and lower said wheels.

46. In a mechanism for raising and lowering the rear wheels of a land and water vehicle, in combination, a motor positioned on said vehicle, a main shaft adapted to be driven by said motor, a pair of wheels adapted to be raised and lowered on said vehicle, a cross shaft positioned on said vehicle, appliances for transmitting the movement of said main shaft to said cross shaft, worm and pinion mechanism for transmitting the movement of said cross shaft to said wheels, and means associated with said main shaft for rendering the same intermittently operative to cause said cross shaft, by means of said worm and pinion mechanism to raise and lower said wheels.

47. In a mechanism for raising and lowering the rear wheels of a land and water vehicle, in combination, a motor positioned on said vehicle, a main shaft adapted to be driven by said motor, a pair of cross shafts mounted on said vehicle, a pair of wheels adapted to be raised and lowered on said vehicle, means associated with said wheels for raising and lowering the same, means for transmitting the movement of one of said cross shafts to said last means, means for transmitting the movement of said second cross shaft to said first cross shaft, means for intermittently transmitting the movement of said main shaft to said second cross shaft, and means for intermittently rendering said last means operative.

48. In a mechanism for raising and lowering the rear wheels of a land and water vehicle, in combination, a motor on said vehicle, a main shaft adapted to be driven by said motor, a first cross shaft mounted on said vehicle, a second cross shaft also mounted on said vehicle, a pair of wheels adapted to be raised and lowered on said vehicle, appliances for transmitting the movement of said second cross shaft to said wheels, appliances for transmitting the movement of said first cross shaft to said second cross shaft, and a clutch mechanism for rendering said main shaft operative to transmit its motion to said first cross shaft.

49. In a mechanism for raising and lowering the rear wheels of a land and water vehicle, a pair of wheels associated with said vehicle, means for slidably mounting said wheels on said vehicle, a pair of cross shafts associated with said vehicle, appliances associated with one of said cross shafts and said means for rendering the same operative, appliances associated with both of said cross shafts whereby one may be caused to operate the other, a motor on said vehicle, a main shaft adapted to be driven by said motor, and friction means associated with said main shaft and one of said cross shafts whereby said main shaft may be intermittently caused to operate said cross shafts to raise and lower said wheels.

50. In a mechanism for raising and lowering the rear wheels of a land and water vehicle, in combination, a pair of wheels associated with said vehicle, slidable means associated with said wheels and said vehicle whereby said wheels may be raised or lowered, a pair of cross shafts associated with said vehicle, a pair of universal joints associated with one of said cross shafts, appliances associated with one of said cross shafts and said slidable means, said appliances functioning to transmit the movement of one of said shafts to said slidable means, appliances associated with both of said cross shafts whereby one may be caused to operate the other, a motor on said vehicle, a main shaft adapted to be driven by said motor, friction means associated with said main shaft and one of said cross shafts whereby the motion of said main shaft may be transmitted intermittently to one of said cross shafts, a clutch mechanism for rendering said friction means operative, and manual means for rendering said clutch mechanism operative.

51. In a combined land and water vehicle, a combination, a pair of rear wheels associated with said vehicle, a propeller associated with said vehicle, a motor on said vehicle, a main shaft adapted to be driven by said motor, a propeller shaft adapted to drive said propeller, a set of cross shafts associated with said vehicle, an inclined shaft associated with one of said cross shafts and said main shaft, a plural part bearing associated with said main shaft, one of said cross shafts and said inclined shaft, appliances on said main shaft and said inclined shaft whereby said main shaft may drive said inclined shaft, appliances on said inclined shaft and another of said cross shafts whereby said inclined shaft may drive said other cross shaft, appliances associated with said other cross shaft and said wheels whereby said other cross shaft may drive said wheels, and means associated with said main shaft and said propeller shaft whereby said main shaft may intermittently be caused to drive the same.

52. In a combined land and water vehicle, in combination, a motor on said vehicle, a main shaft adapted to be driven by said motor, a cross shaft positioned substantially at right angles to said main shaft, a worm gear mounted on each end of said cross shaft, journals for each end of said cross shaft, a pair of swivel connections positioned on said cross shaft and between said worm gears, wheel lifting and lowering means associated with said worm gears and said vehicle, appliances associated with said main shaft and said cross shaft whereby said main shaft may be intermittently caused to operate said cross shaft, and means associated with said main shaft for rendering said appliances operative.

53. In a combined land and water vehicle, in combination, a motor on said vehicle, a main shaft adapted to be driven thereby, mechanism for raising and lowering the rear wheels of said vehicle, means associated with said main shaft and said mechanism for rendering the same operative, said means comprising a pair of friction cones mounted on said main shaft, a cross shaft positioned substantially at right angles to said main shaft, a friction cone on said cross shaft and juxtaposed between said pair of friction cones, clutch members associated with said main shaft for intermittently causing said friction cone to be brought into contact with either of said pair of friction cones, and manual means for rendering said clutch members operative.

54. In a combined land and water vehicle, sets of wheels associated with said vehicle, a motor on said vehicle, a main shaft adapted to be driven by said motor, sets of cross shafts associated with said main shaft and a pair of said wheels, an inclined shaft associated with certain of said cross shafts, appliances associated with said main shaft, said cross shafts and said inclined shaft whereby said main shaft may be caused to drive said shafts to drive said rear wheels, a plural part bearing associated with said main shaft, one of said cross shafts and said inclined shaft, said inclined shaft being provided with a set of grooves at one of its ends, and a bearing positioned on said inclined shaft, one of said appliances being positioned in said bearing and fixed to said inclined shaft by means of said grooves.

55. In a combined land and water vehicle, guiding means for the front wheels of said vehicle, said guiding means comprising sets of circular members secured to the axle of said wheels, anti-friction means associated with said members and said axle, and means associated with said members whereby said axle may be guided and steadied when they are steered.

56. In a wheel guiding and steadying mechanism for a combined land and water vehicle, a pair of front wheels associated with said vehicle, an axle upon which said wheels are mounted, sets of circular members positioned on said axle, anti-friction means associated with said sets of members means and said axle, and manual means positioned on said vehicle for rendering said members and said anti-friction means operative to steady and guide said front wheels.

57. In a mechanism for raising and lowering the rear wheels of a combined land and water vehicle, in combination, a set of rear wheels associated with said vehicle, a pair of tracks positioned on said vehicle, a slidable member adapted to be reciprocated in each of said tracks, a stub shaft associated with each of said slidable members upon which each of said wheels is adapted to be mounted, a screw juxtaposed with each of said tracks and each of said slidable members, a pinion positioned on each of said screws, and mechanism associated with said pinion whereby the same may be operated to turn said screw and raise or lower said slidable members to raise or lower said wheels.

58. In a steadying means for the front wheels of a combined land and water vehicle, an axle upon which said wheels are mounted, said axle being provided with a groove, a pair of members adapted to be reciprocated in said groove, a pair of links secured to said members, a pair of pivoted levers adapted to oscillate said levers, a pair of depending members associated with said axle and upon which said levers are pivoted, a yoke for each of said depending members, a plural part bearing associated with each of said depending members and each of said levers, and a stub shaft associated with each of said bearings upon which said front wheels are mounted.

59. In a combined land and water vehicle, in combination, a pair of rear wheels, means associated with said vehicle and said wheels whereby they may be raised or lowered respectively in an arc of a circumference and in a general vertical direction, and a spring-pressed bearing associated with each of said wheels and said vehicle.

60. In a combined land and water vehicle, a guiding member for steering the front wheels of said vehicle, a front axle with which the front wheels of said vehicle are associated, a yoke member positioned on one end of said guiding member, appliances associated with said yoke member and said front axle for guiding and steadying the same, a loop secured to the other end of said guiding member, and means associated with said loop whereby said guiding member may be permitted an oscillating movement to guide and steady said front wheels.

61. A combined land and water vehicle in which the front wheels thereof are adapted to be raised and lowered through the arc of an entire circumference by means of a set of instrumentalities positioned within said vehicle, and the rear wheels of said vehicle are adapted to be raised and lowered on said vehicle in a vertical direction by other instrumentalities positioned in said vehicle, substantially as described.

In testimony whereof I have signed my name to this specification.

FELIPE CHÁVEZ.